(12) United States Patent
Deaton

(10) Patent No.: US 6,321,845 B1
(45) Date of Patent: Nov. 27, 2001

(54) APPARATUS FOR DEVICE USING ACTUATOR HAVING EXPANDABLE CONTRACTABLE ELEMENT

(75) Inventor: Thomas M. Deaton, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/496,554

(22) Filed: Feb. 2, 2000

(51) Int. Cl.[7] .................................. E21B 34/16
(52) U.S. Cl. ............... 166/363; 166/316; 166/373; 166/386; 166/66.5; 166/113
(58) Field of Search ................. 166/65.1, 363, 166/338, 244.1, 316, 373, 386, 381, 66.5, 113

(56) References Cited

U.S. PATENT DOCUMENTS

| | | |
|---|---|---|
| 3,814,376 | 6/1974 | Reinicke . |
| 4,424,865 | 1/1984 | Payton, Jr. . |
| 4,515,213 | 5/1985 | Rogen et al. . |
| 4,553,735 | 11/1985 | Brundage . |
| 4,619,320 | 10/1986 | Adnyana et al. . |
| 4,756,331 | 7/1988 | Stegmaier . |
| 4,840,346 | 6/1989 | Adnyana et al. . |
| 4,869,349 | 9/1989 | Minear et al. . |
| 4,890,815 | 1/1990 | Hascher-Reichl et al. . |
| 4,959,567 | 9/1990 | Ealey et al. . |
| 5,020,036 | 5/1991 | Petermann et al. . |
| 5,172,717 | * 12/1992 | Boyle et al. . |
| 5,199,497 | 4/1993 | Ross . |
| 5,218,999 | 6/1993 | Tanimoto . |
| 5,267,589 | 12/1993 | Watanabe . |
| 5,318,268 | 6/1994 | Cox et al. . |
| 5,343,963 | * 9/1994 | Bouldin et al. . |
| 5,357,232 | 10/1994 | Suzuki et al. . |
| 5,361,053 | 11/1994 | Hosokawa et al. . |
| 5,375,811 | 12/1994 | Reinicke . |
| 5,389,845 | 2/1995 | Brimhall . |
| 5,501,425 | 3/1996 | Reinicke et al. . |
| 5,694,970 | 12/1997 | Staranchuk . |
| 5,703,553 | 12/1997 | Bushko et al. . |
| 5,831,934 | * 11/1998 | Gill et al. . |
| 5,852,262 | * 12/1998 | Gill et al. . |
| 5,868,375 | 2/1999 | Reinicke et al. . |
| 5,881,310 | * 3/1999 | Airhart et al. . |
| 6,015,266 | 1/2000 | Swatek . |

OTHER PUBLICATIONS

Andersen A., Herfjord H.J., Martinsen A.M., Sangesland S., Sivertsen A.; Feasibility Study of Shape Memory Alloys in Oil Well Applications; IKU Petroleum Research; Jun. 23, 1997, p. 79 and p. 92; IKU Sintef Group; Norway.

Ashley, Steven; Magnetostrictive actuators, Mechanical Engineering, Jun. 1998, pp. 68–70.

* cited by examiner

Primary Examiner—Roger Schoeppel
(74) Attorney, Agent, or Firm—Trop Pruner & Hu P.C.

(57) ABSTRACT

An apparatus and method of operating devices (such as devices in a wellbore or other types of devices) utilizes actuators having expandable or contractable elements. Such expandable or contractable elements may include piezoelectric elements, magnetostrictive elements, and heat-expandable elements. Piezoelectric elements are expandable by application of an electrical voltage; magnetostrictive elements are expandable by application of a magnetic field (which may be generated by a solenoid in response to an electrical current); and heat-expandable elements are expandable by heat energy (e.g., infrared energy or microwave energy). Expandable elements are abutted to an operator member such that when the expandable element expands, the operator member is moved in a first direction, and when the expandable element contracts, the operator member moves in an opposite direction.

19 Claims, 9 Drawing Sheets

APPARATUS FOR DEVICE USING ACTUATOR HAVING EXPANDABLE CONTRACTABLE ELEMENT

BACKGROUND

The invention relates to methods and apparatus of operating devices (such as devices in wellbores) using actuators having expandable or contractable elements.

In a well, various devices may be activated to perform different tasks. Downhole devices may include valves (e.g., flow control valves or safety valves), perforating guns, and other completion components. Different forms of activation mechanisms, including hydraulic, mechanical, or electrical mechanisms, may be used. Mechanical activation typically involves lowering some type of setting or shifting tool to a desired depth to engage the downhole device to apply a force to move an actuator operably coupled to the downhole device. Hydraulic activation typically involves application of hydraulic pressure either through a tubing, a tubing-casing annulus, or a hydraulic control line to an actuator in a downhole device. Electrical activation typically involves communicating electrical power and/or signaling down an electrical cable, such as a wireline, an electrical control line, or other type of electrical line to a downhole actuator, which may include an electronic controller, a motor, or a solenoid actuator.

Conventional electrical actuators, such as solenoid actuators, typically require large amounts of electrical current to operate. Communication of high electrical currents may require relatively heavy electrical cables, which may be difficult to handle and which may take up too much space in a wellbore. Further, in some actuators, relatively sophisticated downhole electronic circuitry may be used. Such electronic circuitry may have reliability problems. Other types of actuators may also be associated with various issues. For example, mechanical actuators may be time-consuming and difficult to operate. Hydraulic and other fluid pressure actuators require a fluid pressure communications path, which may be impractical in certain parts of the wellbore. Also, leaks may develop that would render the hydraulic or other fluid pressure actuator inoperable.

A need thus continues to exist for improved actuators for operating downhole devices and other types of devices.

SUMMARY

In general, according to one embodiment, an apparatus for operating a downhole device in a wellbore includes an actuator having one or more elements expandable by input energy and an operator mechanism operably coupled to the actuator.

Other embodiments and features will become apparent from the following description, the drawings, and the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

As used here, the terms "up" and "down"; "upper" and "lower"; "upwardly" and downwardly"; and other like terms indicating relative positions above or below a given point or element are used in this description to more clearly described some embodiments of the invention. However, when applied to equipment and methods for use in wells that are deviated or horizontal, such terms may refer to a left to right, right to left, or other relationship as appropriate.

Figure 1:
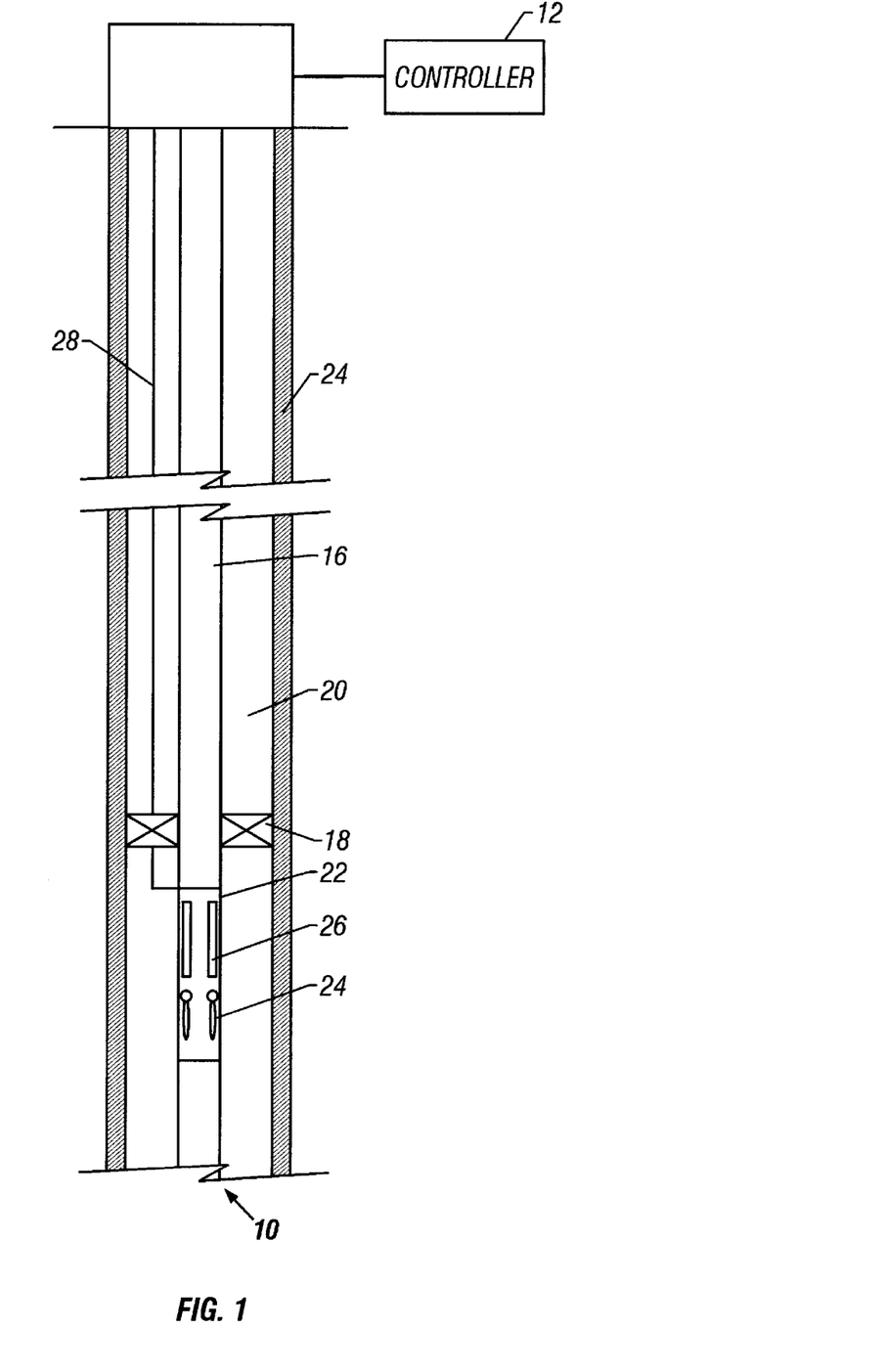
FIG. 1 illustrates an embodiment of a completion string having a subsurface safety valve in a wellbore.

Referring to FIG. 1, a completion string in accordance with one example embodiment is positioned in a wellbore 10. The wellbore 10 may be part of a vertical well, deviated well, horizontal well, or a multilateral well. The wellbore 10 may be lined with casing 14 (or other suitable liner) and may include a production tubing 16 (or other type of pipe or tubing) that runs from the surface to a hydrocarbon-bearing formation downhole. A production packer 18 may be employed to isolate an annulus region 20 between the production tubing 16 and the casing 14.

A subsurface safety valve assembly 22 may be attached to the tubing 20. The subsurface safety valve assembly 22 may include a flapper valve 24 or some other type of valve (e.g., a ball valve, sleeve valve, disk valve, and so forth). The flapper valve 24 is actuated opened or closed by an actuator assembly 26. During normal operation, the valve 24 is actuated to an open position to allow fluid flow in the bore of the production tubing 16. The actuator assembly 26 in the safety valve assembly 22 may be activated by signals in a control line 28 (e.g., an electrical cable, fiber optic line, waveguide, and so forth) that runs up the wellbore 10 to a controller 12 at the surface. The safety valve 24 is designed to close should some failure condition be present in the wellbore 10 to prevent further damage to the well.

Although the described embodiment includes an actuator used with a subsurface safety valve, it is contemplated that further embodiments may include actuators used with other types of downhole devices. Such other types of downhole devices may include, as examples, flow control valves, packers, sensors, pumps, and so forth. Other embodiments may include actuators used with devices outside the well environment.

In accordance with some embodiments of the invention, the actuator assembly includes one or more expandable elements that are expandable by an input energy. Such expandable elements may include piezoelectric elements, magnetostrictive elements, and heat-expandable elements. Other types of expandable elements may also be employed. The expandable elements are adapted to move an operator member, which may be directly or indirectly connected to a downhole device to be actuated. In further embodiments, contraction of such elements may be used to actuate downhole devices. For example, the elements may initially be maintained in an expanded state, with input energy removed to contract the elements for device actuation.

In accordance with further embodiments, the actuator assembly may include at least a first actuator and a second actuator. The first actuator (referred to as an operating actuator) is adapted to move the operator member in incremental steps, while the second actuator (referred to as a holding or latching actuator) is adapted to latch or maintain the operator member in its current position after each incremental move. The first actuator is alternately activated and deactivated at a predetermined frequency by cycling an input activation energy between on and off states at the predetermined frequency. Each cycle of activation and deactivation of the first actuator moves the operator member by a predetermined incremental displacement. The first and second actuators may be associated with different frequency responses such that cycling of the activation energy at the predetermined frequency causes the first actuator to turn on and off but allows the second actuator to be maintained in an energized condition. Each of the first and second actuators may be associated with a time constant, with the time constant of the second actuator being greater than that of the first actuator. Depending on the type of expandable element, the activation energy may be electric energy, magnetic energy, heat energy, infrared energy, microwave energy, or other forms of energy.

Figure 2:
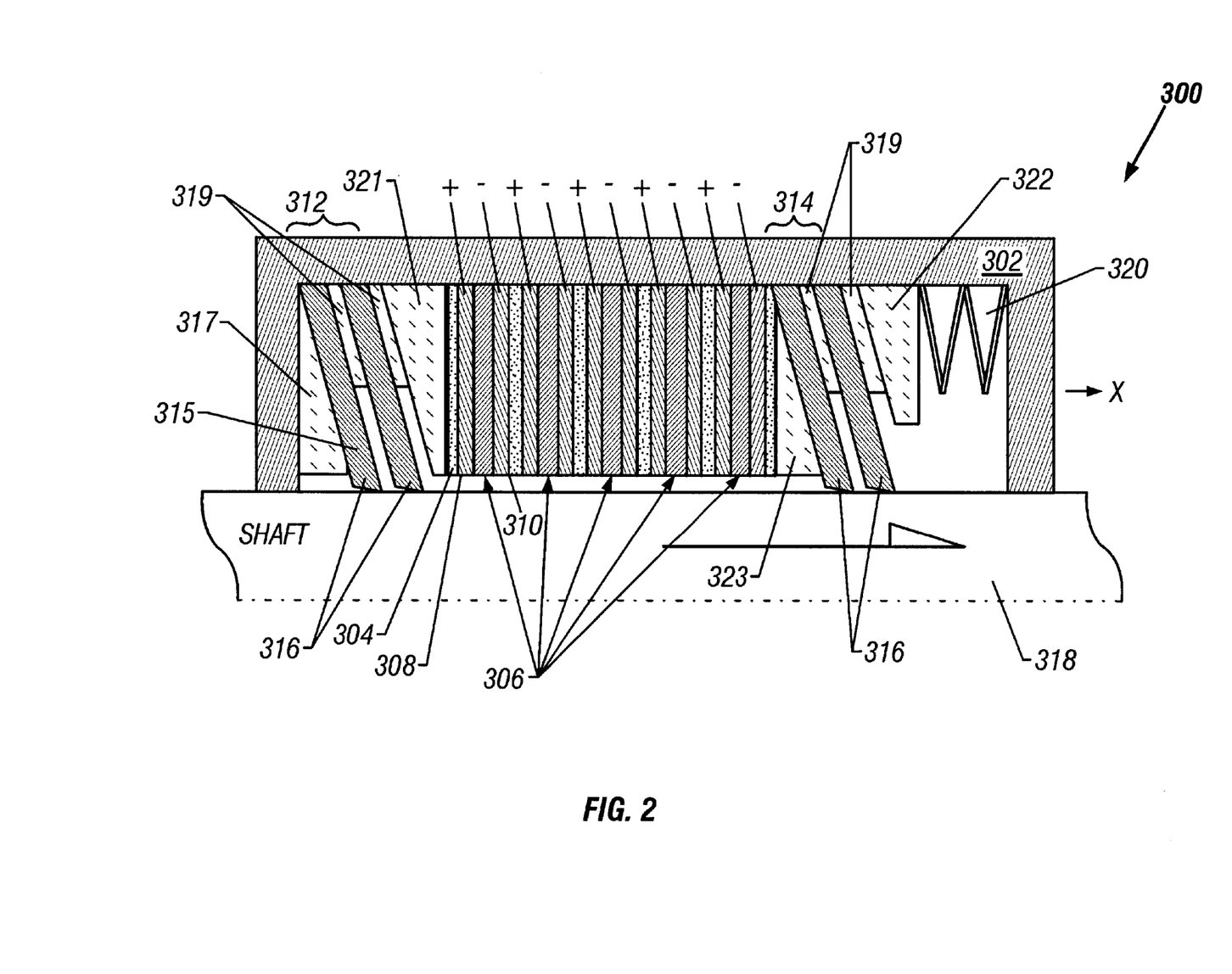
FIG. 2 illustrates an actuator having piezoelectric elements that are expandable in response to an applied input voltage in accordance with an embodiment.

Referring to FIG. 2, an actuator 300 includes piezoelectric elements each expandable by application of an input electrical voltage across the element. The actuator 300 may be referred to as a piezoelectric linear motor. One type of piezoelectric material is lead zirconate titanate. Another type of piezoelectric material includes BaTiO$_3$. Generally, the change in length of a piezoelectric material is proportional to the square of the applied voltage.

A housing 302 in the actuator 300 contains layers of conductors 308, 310, insulators 304, and piezoelectric disks 306. Each piezoelectric disk 306 is sandwiched between a first conductor plate 308 and a second conductor plate 310, with the conductor plates 308 and 310 coupled to an input voltage. The insulator layers are placed between adjacent conductors 308, 310 to provide electrical isolation. To activate the actuator 300, the input voltage is applied to the conductor plates 308 and 310. This causes the piezoelectric disks 306 to expand in an axial direction, generally indicated as X.

The actuator 300 includes a first ratchet mechanism 312 (referred to as a static or holding ratchet mechanism) and a second ratchet mechanism 314 (referred to as an operating ratchet mechanism). In one embodiment, each of the ratchet mechanisms 312 and 314 may include Belleville springs 315 each arranged at an angle such that sharp tips 316 of the Belleville springs 315 can grip the outer wall of a shaft 318 that is part of the operator member of a downhole device. Instead of Belleville springs 315, other forms of engagement tablets may be used to engage the shaft 318. Spacers 317, 321, 323, and 322 having generally triangular cross-sections are positioned to arrange the Belleville springs 315 at the desired angle with respect to the outer surface of the shaft 318. Spacers 319 are placed between adjacent Belleville springs or tablets 315. A spring 320 placed between the spacer 322 and applies a force against the spacer 322 in a general direction opposite to the X direction.

In operation, an input activation voltage that cycles between an on state and an off state is applied to the actuator 300. Application of the activation voltage causes the piezoelectric disks 306 to expand to move the operating ratchet mechanism 314 so that the shaft 318 is moved by a predetermined incremental distance. Removal of the activation voltage causes the piezoelectric disks 306 to contract so that the operating ratchet mechanism 314 is moved backward by action of the spring 320. The shaft 318, however, is maintained in position by the static or holding ratchet mechanism 312. Subsequent cycles of the activation voltage causes the shaft 318 to move forward (in generally the X direction) by incremental steps. This provides a simple "inch worm" type of linear motor.

In other embodiments, the actuator 300 may be arranged differently. For example, instead of multiple piezoelectric disks 306, a single piezoelectric element may be used. Further, in another arrangement, the holding ratchet mechanism 312 may be omitted. In another arrangement, a ratchet mechanism may be designed such that it engages a shaft or another type of operator member when the piezoelectric element or disks expand and disengages from the shaft or another type of operator member when the piezoelectric element or disks contract. Many other types of arrangements are also possible.

Figure 3:
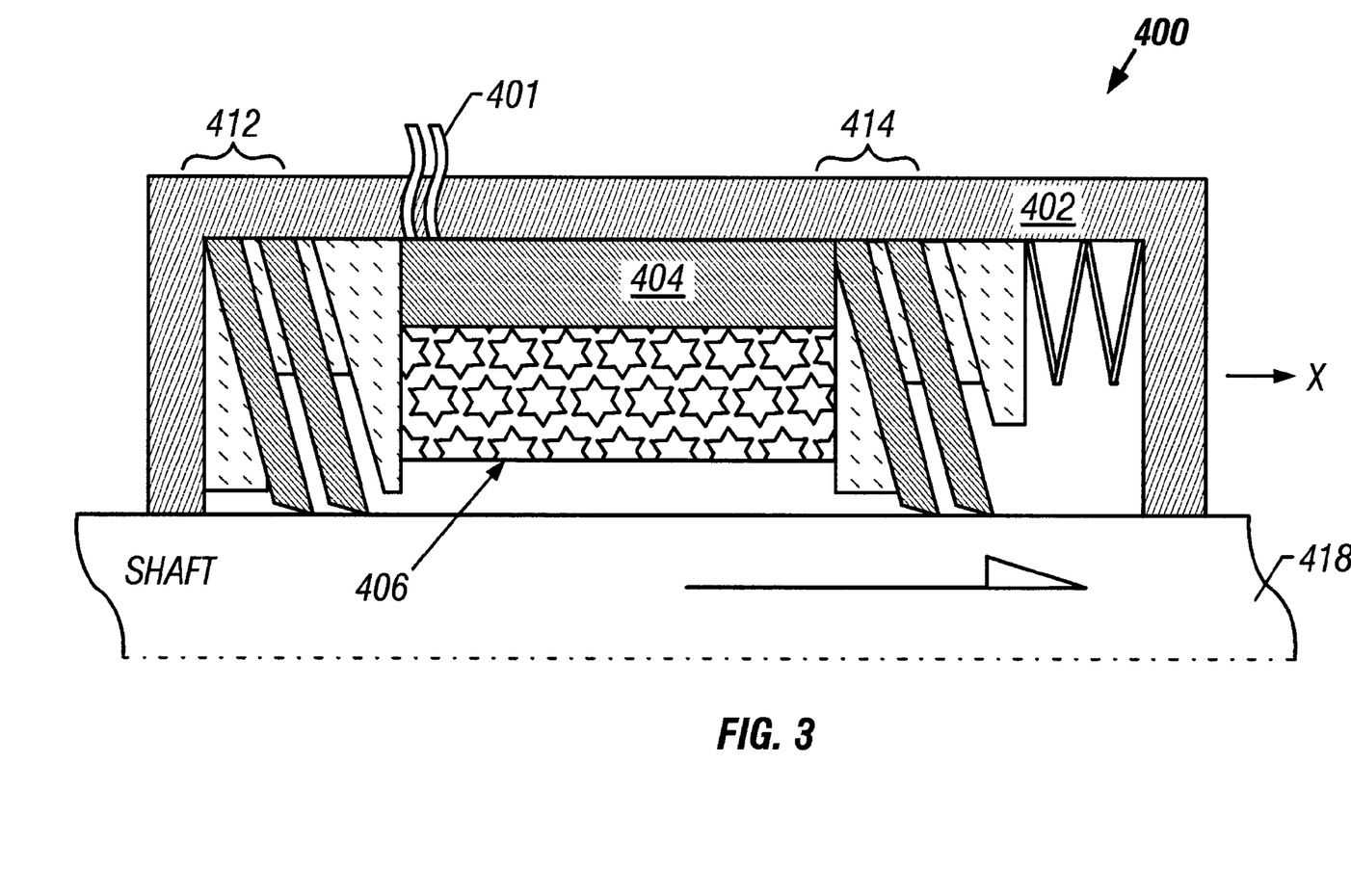
FIG. 3 illustrates an actuator having a magnetostrictive element that is expandable in response to an applied magnetic field in accordance with another embodiment.

Referring to FIG. 3, in accordance with another embodiment, an actuator 400 includes an expandable element formed of a magnetostrictive material that changes its dimensions in response to an applied magnetic field. One example of a magnetostrictive material is Terfenol-D, which is a special rare-earth iron material that changes its shape in response to an applied magnetic field. Terfenol-D is a near-single crystal of the lanthanide elements terbium and dysprosium plus iron. Another type of magnetostrictive material includes nickel or a nickel alloy.

The actuator 400 includes a housing 402 containing a static ratchet mechanism 412 and an operating ratchet mechanism 414, similar to mechanisms 312 and 314 in FIG. 2. However, instead of piezoelectric disks 306, the actuator 400 includes a magnetostrictive cylinder 406 that is surrounded by a solenoid coil 404 connected to electrical wires 401. Application of electrical energy into the coil 404 causes generation of a magnetic field. In response to the presence of the magnetic field, the magnetostrictive cylinder 406 expands in generally the X direction (as well as in other directions). Expansion of the magnetostrictive cylinder 406 causes movement of the operating ratchet mechanism 414 to move the shaft 418 by an incremental step.

Other arrangements of the actuator 400 are also possible. For example, instead of a singular magnetostrictive element 406, multiple elements may be used. Also, the interaction between the magnetostrictive element 406 and one or more ratchet mechanisms or other types of operator mechanisms may be different in further embodiments.

Figure 4:
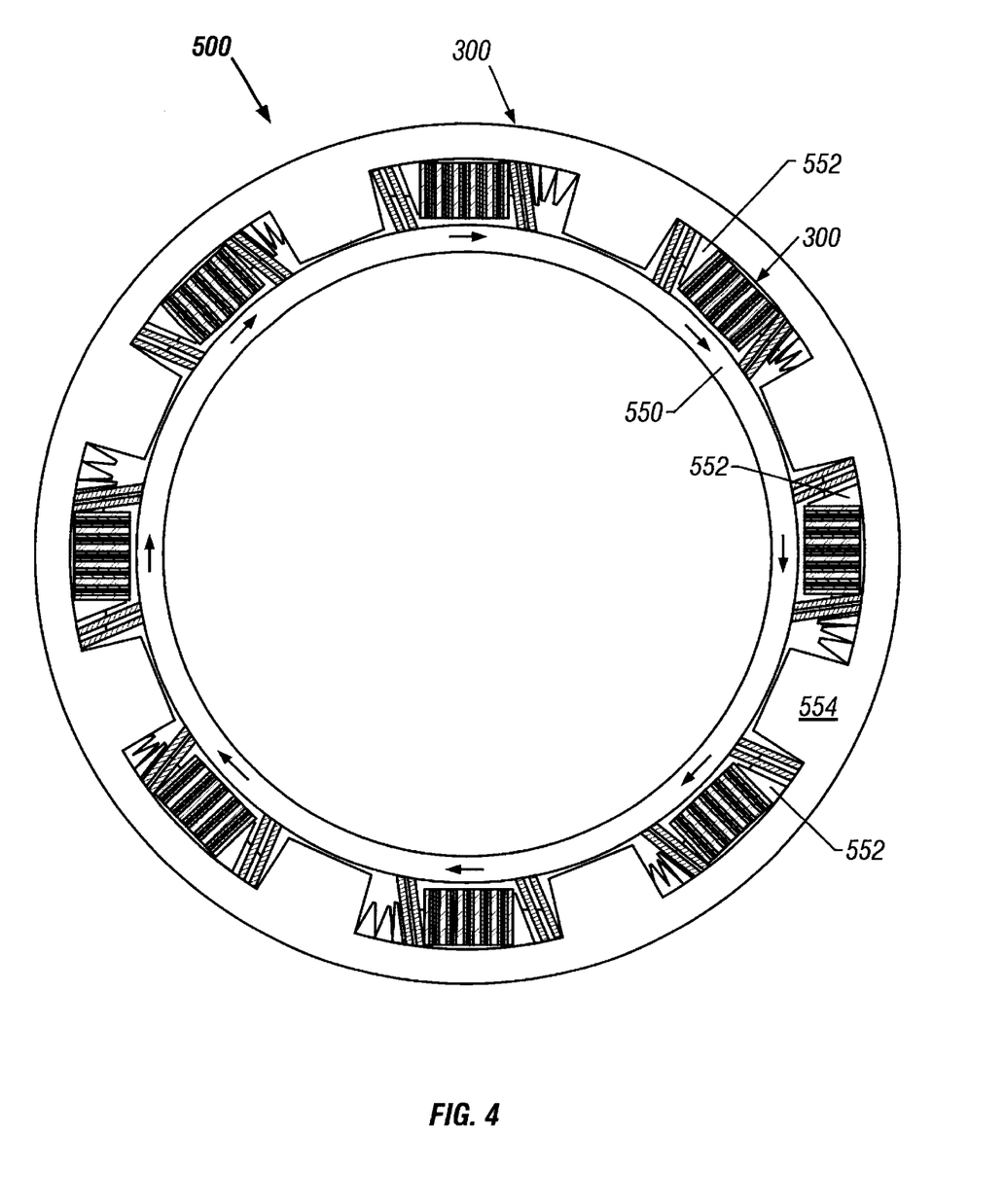
FIGS. 4 and 5 illustrate a rotary motor employing actuators of FIG. 2.
Figure 5:
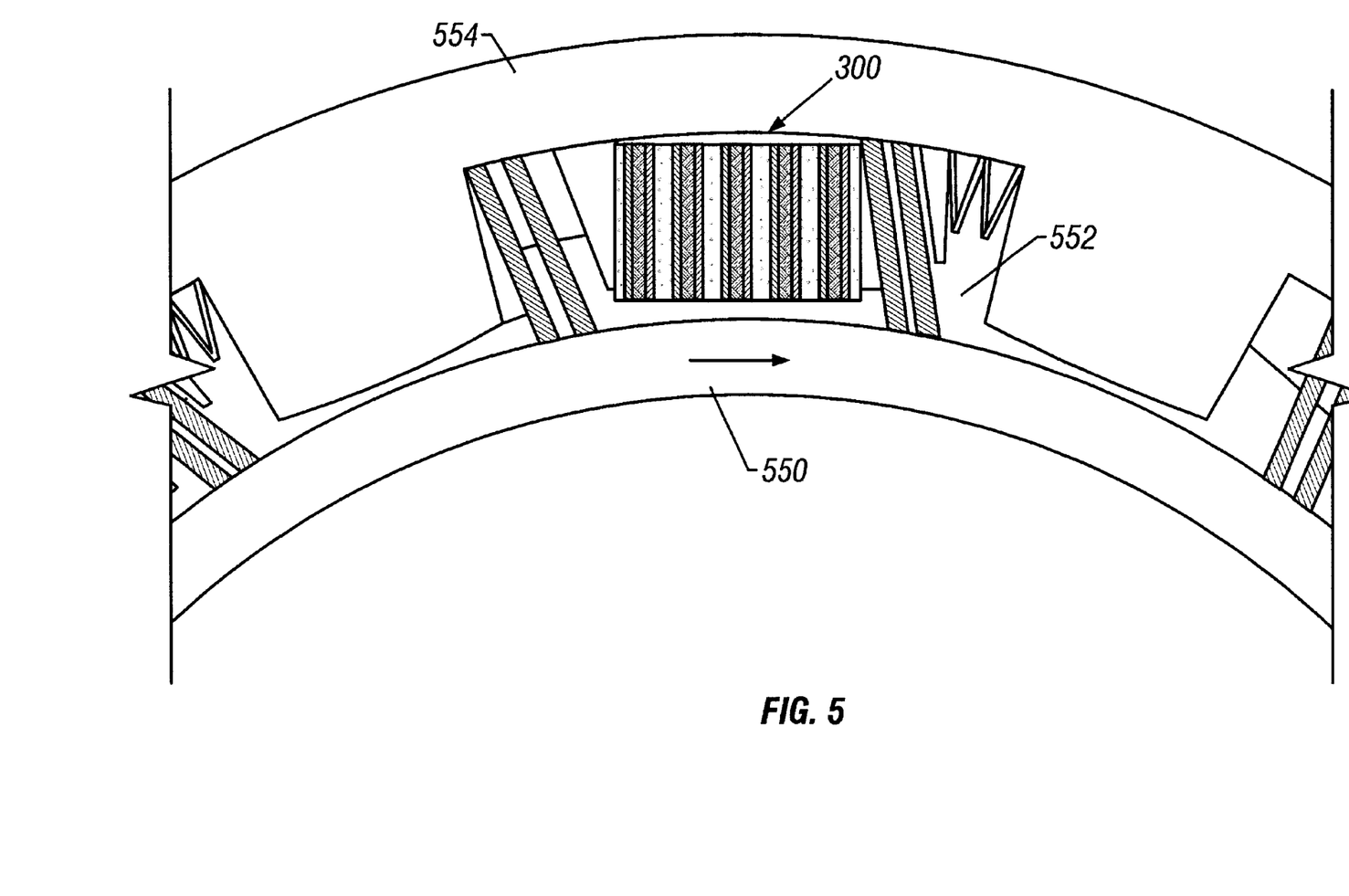

Referring to FIGS. 4 and 5, in accordance with another embodiment, a plurality of actuators 300 (or alternatively, actuators 400) may be used to rotate a cylindrical sleeve 550 to provide a rotary-type motor 500. The plurality of actuators 300 may be positioned in cavities 552 formed in a housing 554 of the motor 500. In the illustrated embodiment, the actuators 300 are arranged around the outer circumference of the sleeve 550. The number of actuators 300 used depends upon the desired actuation force. Input signals provided to the actuators 300 in the illustrated arrangement causes clockwise rotation of the sleeve 550. A different arrangement of the actuators 300 may rotate the sleeve 350 in the opposite direction. In a further embodiment, the actuators 300 may be arranged to contact the inner wall of the sleeve 550.

Figure 6:
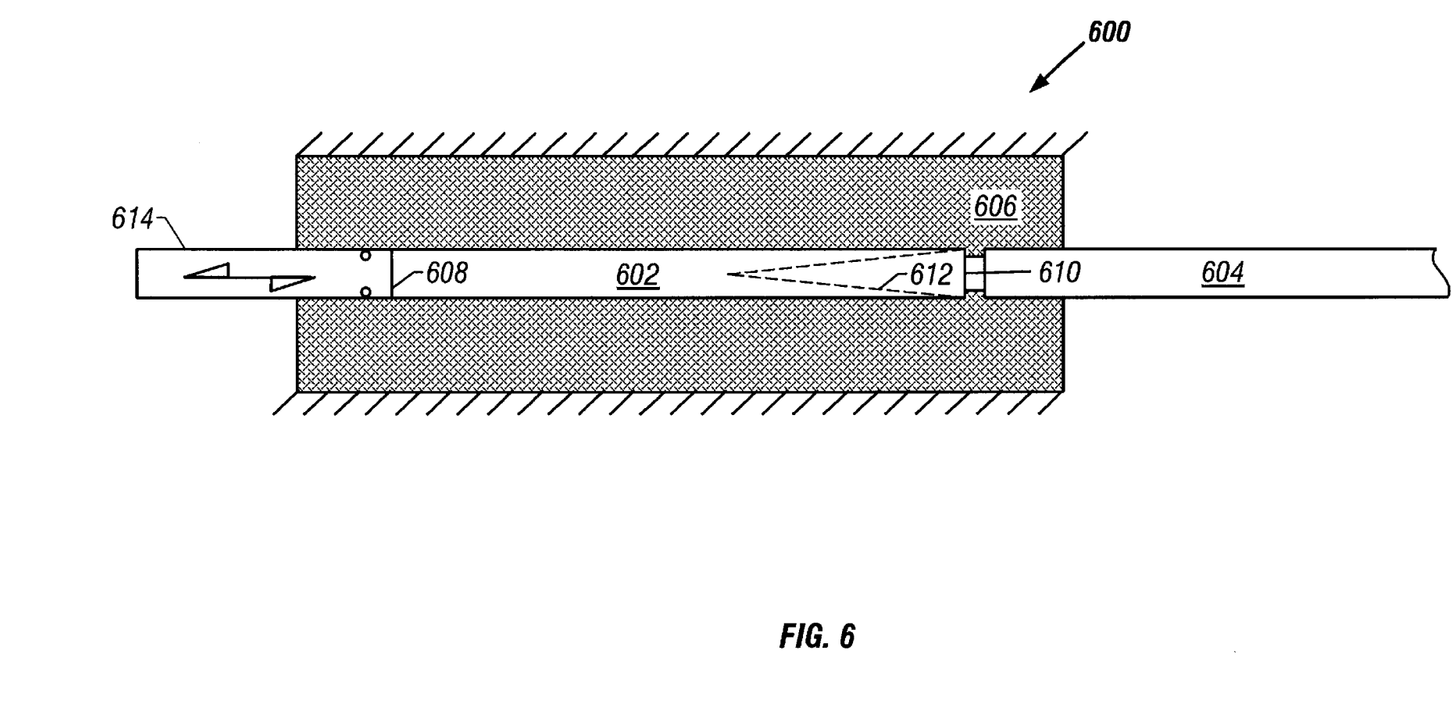
FIG. 6 illustrates an actuator having a heat-expandable element in accordance with yet another embodiment.

Referring to FIG. 6, in accordance with yet another embodiment, an actuator 600 includes an expandable element 602 that is expanded by application of some type of heat energy, such as infrared energy or microwave energy. Examples of heat-expandable materials include aluminum, shape-memory alloys (e.g., Nitinol), and other materials. The infrared or microwave energy may be propagated down a waveguide or fiber optic line 604. The expandable element 602, generally tubular in shape, is positioned inside a bore of a cylindrical insulator 606 that provides heat insulation. One end 610 of the expandable material 602 is exposed to an end of the waveguide 604. A generally conical cut 612 is formed proximal the end 610 of the expandable element 602 to increase the surface area that is exposed to energy propagated down the waveguide or fiber optic line 604.

The other end 608 of the expandable element 602 is in abutment with an output rod 614, which is formed of an insulating material. The output rod 614 is part of an operator member for a device to be actuated. To activate the actuator 600, infrared or microwave energy is propagated down the waveguide or fiber optic line 604, which may be routed down a control line from the surface, to heat up the expandable element 602. Heating the expandable element 602 causes expansion in the axial direction to move the output rod 614. A spring (not shown) may be provided to apply a force against the expandable element 602 so that, when energy is removed from the waveguide or fiber optic line 604 and the expandable element 602 is allowed to cool, the spring may move the output rod 614 back as the expandable element 602 contracts.

The actuator 600 as shown in FIG. 6 can be used in pairs, with one being an operating actuator and the other one being a holding actuator. The operating actuator may be used to move an operator member in incremental steps, as the input energy is cycled between on and off states. The holding actuator is designed to remain activated to maintain or latch the current position of the operator member. The heat-expandable elements 602 in the operating and holding actuators 600 may be designed to have different time constants. This may be performed by varying the mass of the expandable element 602. Alternatively, the amount of insulation 606 may be varied to vary the time constant. Thus, as the heat energy provided down the waveguide 604 is periodically activated and deactivated, the heat-expandable element 602 of the operating actuator responds by expanding and contracting. However, the expandable element 602 of the holding actuator remains in an expanded condition since it is designed to have a larger time constant and thus requires a longer time to respond to the change in input energy.

Similarly, the actuators 300 and 400 containing the piezoelectric and magnetostrictive elements, respectively, may be used in pairs (operating and holding actuator pairs). The designs of the actuators 300 and 400 may be modified by removing the static ratchet mechanism (312 and 412, respectively) in each. Further, the operating ratchet mechanism (314 or 414) may be modified so that expansion and contraction of the expandable element 306 or 406 moves the operating ratchet mechanism 314 and 414 into or out of engagement with the operator member of the device to be actuated.

The time constants of the piezoelectric or magnetostrictive elements in the actuators 300 and 400, respectively, may be varied by varying the amounts of the material used in the holding and operating actuators. Thus, the operating actuator 300 or 400 may be designed to have an expandable element with a lower time constant; that is, it is capable of expanding and contracting at a relatively higher rate. The holding actuator 300 or 400, on the other hand, includes an expandable material with a higher time constant; that is, the material expands and contracts at a relatively slower rate. The variation of the time constants may be performed by varying the masses of the materials. This allows the operating actuator 300 or 400 to cycle between expanded and contracted states while the holding actuator 300 or 400 remains in an expanded state.

Figure 7:
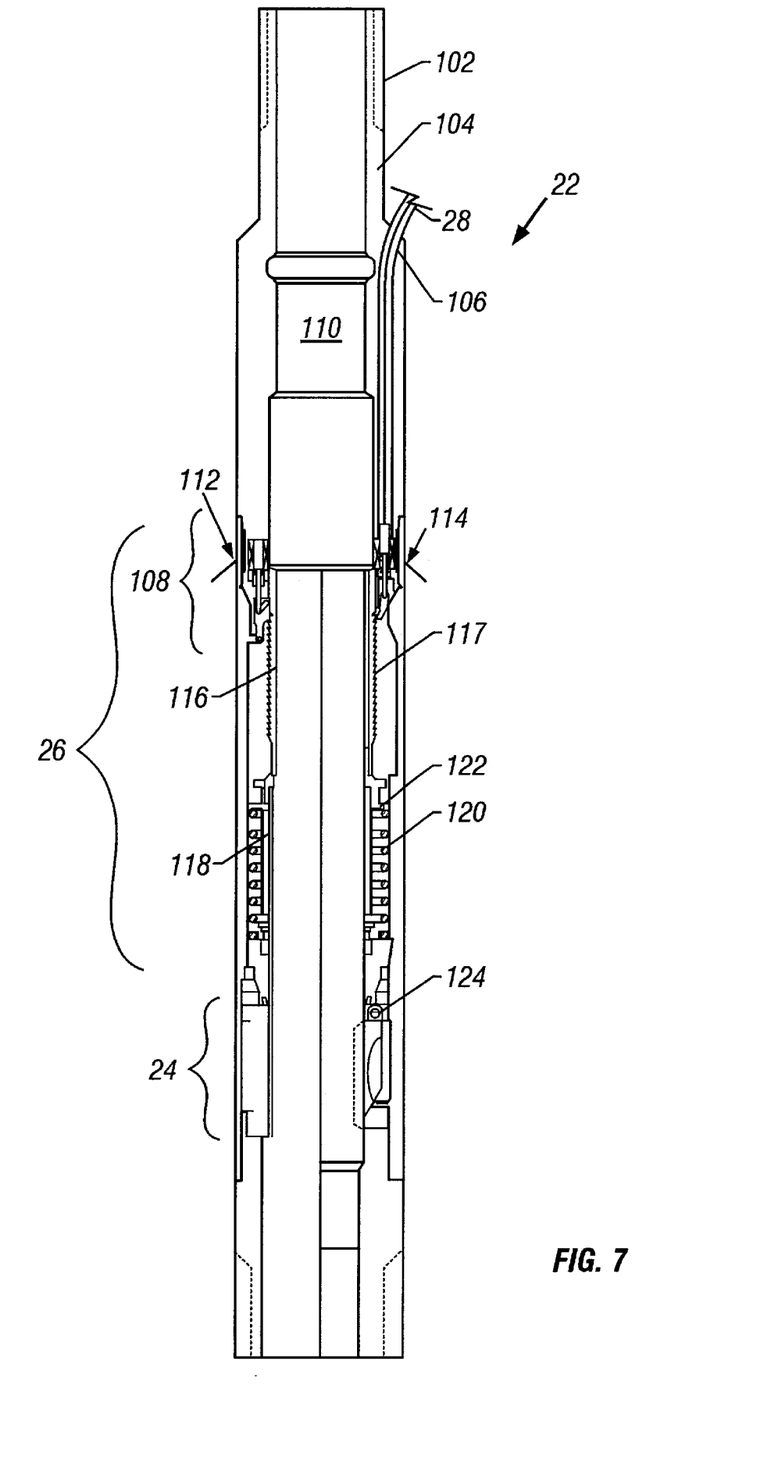
FIG. 7 is a longitudinal sectional view of a subsurface safety valve assembly including actuators of FIG. 6 in accordance with one embodiment.

Referring to FIG. 7, the subsurface safety valve assembly 22 in accordance with one embodiment includes actuators having heat-expandable elements (such as in actuator 600 in FIG. 6). The safety valve assembly 22 includes a housing 104 having at its upper and lower ends threaded connections for connection to other downhole equipment, such as the production tubing 16 (FIG. 1). The housing 104 defines an inner bore 110 that is in communication with the bore of the production tubing 16 to enable fluid flow when the valve 24 is open. The housing 104 also defines a side conduit 106 in which a waveguide or fiber optic line may be run to an actuator mechanism 108 that is part of the actuator assembly 26. During normal operation of the well, the actuator assembly 26 maintains the valve 24 open to allow production fluids to flow through the bore 110 up to the production tubing 16.

In accordance with one embodiment, the actuator mechanism 108 includes at least two actuators 112 and 114 (each including heat-expandable elements). Such actuators are referred to as heat-controlled actuators. A heat-controlled actuator operates by applying input heat energy (e.g., infrared or microwave energy) to a heat-expandable element to move an operator member.

Both the first and second heat-controlled actuators 112 and 114 are coupled to a ratchet sleeve 116. The outer circumference of the ratchet sleeve 116 has a teeth profile 117 that is engageable by the heat-controlled actuators 112 and 114. The lower end of the ratchet sleeve 116 is connected to a flow tube 118 that is adapted to operate the flapper valve 24 between an open or closed position. The flow tube 118 has an inner bore (that is coaxial with the bore 110 of the housing 104) in which fluid may flow. A spring 120 provides an upwardly acting force against a flange portion 122 connected to the flow tube 118. The spring 120 is designed to move the flow tube 118 upwardly to close the flapper valve 24 in the absence of an activation energy to the heat-controlled actuators 112 and 114. The flapper valve 24 rotates about a pivot 124. As shown in FIG. 7, the flapper valve 24 is in its open position. If the flow tube 118 is allowed to rise, the flapper valve 24 rotates about its pivot 124 to the closed position.

To open the flapper valve 24, heat energy provided down the control line 28 (e.g., a waveguide or fiber optic line) is communicated to both the first and second actuators 112 and 114. The input heat energy is cycled on and off and may be in the form of a square wave, sinusoidal, or other signal. Another type of input signaling may include a train of pulses. In accordance with one embodiment, the heat-controlled actuator 112 is adapted to move the ratchet sleeve 116 (and thereby the flow tube 118) downwardly in incremental steps. Each cycle of heat energy applied in the control line 28 moves the ratchet sleeve 116 down by a predetermined incremental distance. Because the ratchet sleeve 116 and the flow tube 118 are moved by a relatively small distance, the heat energy needed to operate the actuator 112 may be reduced to allow low power actuation of the subsurface safety valve assembly 22.

The second heat-controlled actuator 114 is adapted to maintain the position of the ratchet sleeve 116 once it has been moved incrementally by the first heat-controlled actuator 112. Thus, each cycle of heat energy activates the first heat-controlled actuator 112 to move the ratchet sleeve 116 down by the predetermined incremental distance, followed by deactivation of the first heat-controlled actuator 112. The frequency response characteristics of the first and second solenoid actuators 112 and 114 and the frequency of the input heat signal are selected such that the first heat-controlled actuator 112 turns on and off in response to the input signal but the second heat-controlled actuator 114 remains in an activated state to maintain the position of the ratchet sleeve 116. By maintaining the second heat-controlled actuator 114 activated and engaged to the ratchet sleeve 116, heat energy may be removed from the first actuator 112 to start the next actuation cycle. This continues until the ratchet sleeve 116 and flow tube 118 have moved downwardly by a sufficient distance to fully open the flapper valve 24. The first actuator 112 may be referred to as an operating actuator while the second actuator 114 may be referred to as a holding actuator or a latching actuator.

Figure 8:
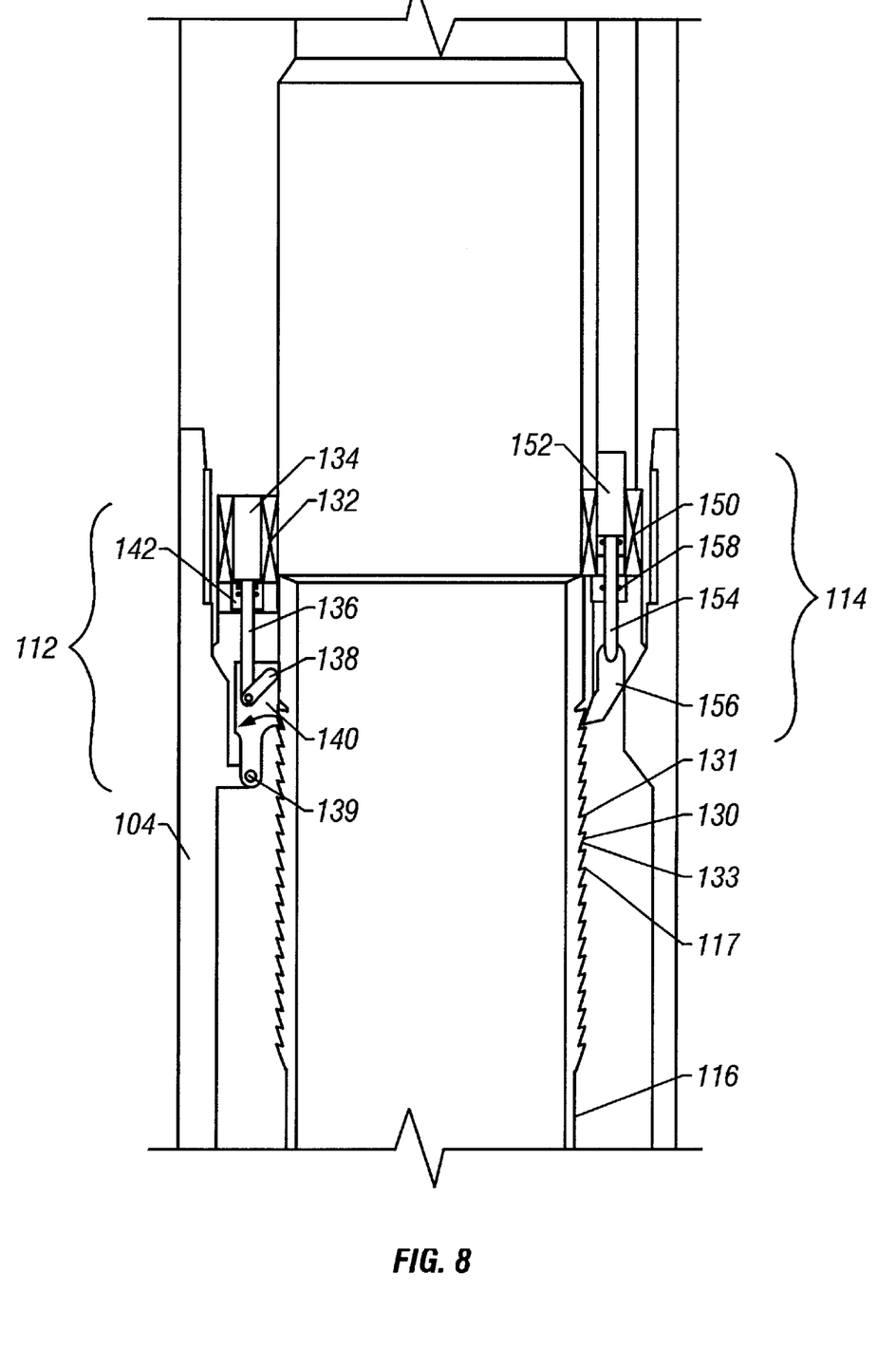
FIG. 8 is a more enlarged sectional view of a portion of the subsurface safety valve assembly of FIG. 7.

Referring further to FIG. 8, the heat-controlled actuators 112 and 114 and the ratchet sleeve 116 are illustrated in greater detail. The teeth profile 117 formed on the outer circumference of the ratchet sleeve 116 includes a plurality of teeth 130. Each tooth 130 is generally triangular in shape with a generally perpendicular (to the axis of the ratchet sleeve 116) edge 131 and a slanted edge 133 to provide a ratchet mechanism, as further described below.

The operating heat-controlled actuator 112 includes an insulator cylinder 132 that surrounds a heat-expandable element 134. The heat-expandable element 134 is expandable in a longitudinal direction inside the insulator 132. The element 134 is abutted to a control rod 136 that is connected to a hook 138 to move an engagement member 140 into or out of engagement with a tooth 130 of the ratchet sleeve 116. The lower end of the engagement member 140 is pivotally connected at a pivot 139 to the housing 104 of the safety valve assembly 22. When the control rod 136 is moved downwardly, the engagement member 140 is pushed toward the tooth 130 to engage the ratchet sleeve 116. Upon engagement of the member 140 to a tooth 130 of the ratchet 116, further downward movement of the control rod 136 by the heat-expandable element 134 moves the ratchet sleeve 116 down by some predetermined distance. When energy is removed from the heat-expandable element 134, a spring 142 positioned in an annular space around the control rod 136 pushes the rod 136 upwardly to its initial reset position as the element 134 contracts. Upward movement of the control rod 136 causes the engagement member 140 to disengage from the tooth 130 of the ratchet sleeve 116.

The holding heat-controlled actuator 114 includes an insulator cylinder 150 that surrounds a heat-expandable element 152. The lower end of the heat-expandable element 152 is abutted to a control rod 154, which in turn is connected to a ratchet engagement member 156. A spring 158 is provided in an annular space around the control rod 154 to push the rod 154 upwardly when the heat-expandable element 152 is in its contracted state.

Application of heat energy to the heat-expandable element 152 causes expansion of the element 152 in a longitudinal direction. The expansion of the element 152 causes a corresponding downward movement of the control rod 154 and ratchet engagement member 156. The element 152, control rod 154, and ratchet engagement member 156 are moved by a sufficient distance to engage a tooth 130 of the ratchet sleeve 116. However, the holding heat-controlled actuator 114 is not designed to move the ratchet sleeve 116.

Rather, the holding heat-controlled actuator 114 is used to maintain or latch the position of the ratchet sleeve 116 after it has been moved by the operating actuator 112. As a consequence, the heat energy requirement of the holding actuator 114 can be lower than the energy requirement of the operating actuator 112, resulting in lower energy requirements of the heat-controlled actuation mechanism 108.

As shown in FIG. 8, the operating heat-controlled actuator 112 is in the engaged position (element 134 expanded) and the holding heat-controlled actuator 114 is in the disengaged position (element 152 contracted). This, however, does not necessarily reflect actual operation of the actuators 112 and 114, since presence of an input activation heat energy may activate both actuators in one embodiment. However, in a further embodiment, separate input signals may be provided to the actuators 112 and 114 for independent control.

In operation, to open the flapper valve 24, an input signal (heat energy) is applied down the control line 28 to the heat-controlled actuators 112 and 114 to energize both of the heat-expandable elements 134 and 152. As a result, the elements 134 and 152 expand and respective control rods 136 and 154 are moved downwardly to engage the first and second ratchet engagement members 140 and 156 to the next tooth 130 of the ratchet sleeve 116. Further increase in the amount of energy down the control line 28 causes the element 134 in the operating actuator 112 to expand more to move the control rod 134 downwardly to move the ratchet sleeve 116 by a predetermined incremental distance. Energy may then be removed from the control line 28 followed by the next activation/deactivation cycle a predetermined time period later.

The heat-controlled actuators 112 and 114 may be designed with different time constants to provide for different frequency responses. For example, the mass of the heat-expandable element 152 may be relatively large to provide a large time constant. On the other hand, the mass of the heat-expandable element 134 may be less than that of the element 152 to provide a smaller time constant. The different time constants of the first and second elements 134 and 152 enable different frequency responses of the actuators 112 and 114. Thus, if an input signal is cycled at a predetermined rate that is greater than the time constant of the first heat-expandable element 134 but less than the time constant of the second heat-expandable element 152, energy can be cycled to expand and contract the first element 134 (associated with the operating actuator 112) while the second element 152 (associated with the holding actuator 114) remains in an expanded state.

When the holding actuator 114 is energized, it prevents upward movement of the ratchet sleeve 116 to prevent resetting of the valve assembly 22 when heat energy is removed to deactivate the operating actuator 112 during the inactive portion of an input signal cycle. Due to the slanted edges 133 of the teeth 130, the operating actuator 112 can continue to move the ratchet sleeve 116 downwardly in incremental steps even though the holding actuator 114 is engaged to the ratchet sleeve 116. Downward shifting of the ratchet sleeve 116 allows the holding actuator 114 to engage successive teeth 130 in the teeth profile 117 until the operating actuator 112 has moved the valve 24 to the open position.

In further embodiments, the operating and holding actuators 112 and 114 may include piezoelectric or magnetostrictive expandable elements instead of heat-expandable elements. The design can be modified such that the input energy provided is electrical energy. The electrical energy may be provided directly to piezoelectric elements to expand such elements. With a magnetostrictive design, the electrical energy may be provided to a solenoid that generates a magnetic field to expand the magnetostrictive elements. In either case, the input electrical signal may be cycled at a predetermined frequency such that the operating actuator 112 (including piezoelectric or magnetostrictive elements) may expand and contract in response to the input signal. In the holding actuator 114, the piezoelectric or magnetostrictive elements may have a time constant selected such that it does not respond as quickly to the input signal as the elements in the operating actuator 112. As a result, the piezoelectric or magnetostrictive elements in the holding actuator 114 remain in an expanded state to allow latching of the ratchet sleeve 116.

In other embodiments, the holding actuator may not necessarily include an expandable element. Instead, the holding actuator may be a mechanical retainer element.

Figure 9:
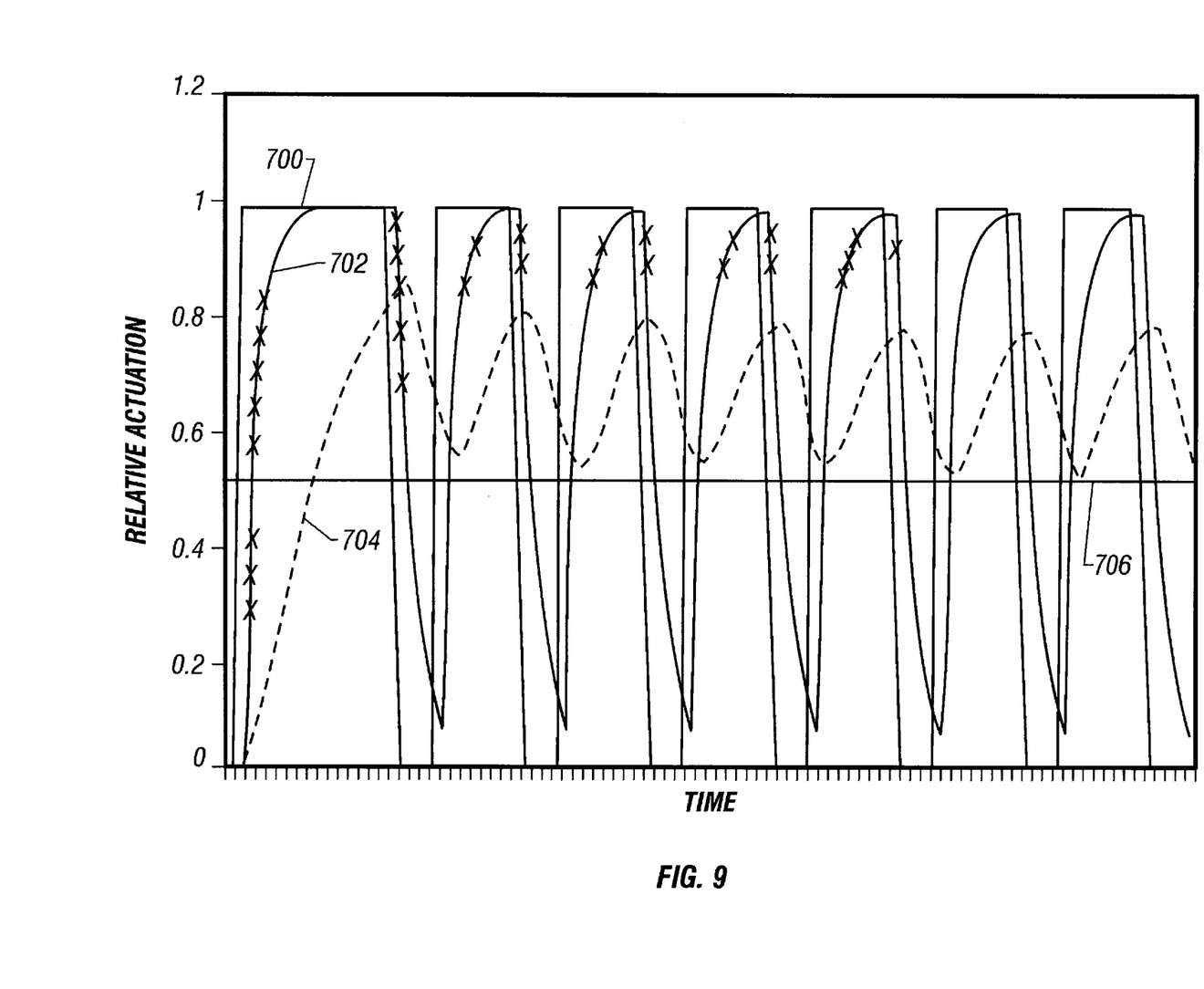
FIG. 9 is a timing diagram including an input signal and waveforms representing activation of the actuators of FIGS. 7 and 8.

Referring to FIG. 9, various waveforms representing an input activation energy and relative actuation states of operating and holding actuators are illustrated. An input signal 700 having a square waveform is provided, which may represent electrical energy, magnetic energy, infrared energy, microwave energy, or another form of energy. The duration of the initial pulse of the input signal 700 is larger than subsequent pulses to activate both the operating and holding actuators. The activation of the operating actuator is shown by waveform 702, while the activation of the holding actuator is shown by the waveform 704. Because the time constant of the holding actuator is larger than that of the operating actuator, it takes a longer time for the holding actuator to activate. A threshold level 706 shows the threshold above which the actuators are considered to be activated (that is, expandable elements are in the expanded state). After the initial larger pulse, the input signal 700 is subsequently cycled between on and off states at a predetermined frequency. This activates and deactivates the operating actuator, as shown by the waveform 702. However, due to the larger time constant of the holding actuator, the activation level of the holding actuator does not fall below the actuation threshold 706.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An apparatus for use in a wellbore, comprising:
   a ratchet mechanism;
   an activable member responsive to input energy, the activable member including a material expandable by the input energy; and
   an operator mechanism actuatable by the ratchet mechanism in response to expansion of the material.

2. The apparatus of claim 1, wherein the material includes a piezoelectric material.

3. The apparatus of claim 2, wherein the piezoelectric material includes plural piezoelectric disks.

4. The apparatus of claim 2, wherein the input energy includes electrical energy.

5. The apparatus of claim 1, wherein the material includes a magnetostrictive material.

6. The apparatus of claim 5, wherein the input energy includes magnetic energy.

7. The apparatus of claim 6, further comprising a solenoid to generate the magnetic energy in response to an electrical signal.

8. The apparatus of claim 1, wherein the material includes a heat-expandable material.

9. The apparatus of claim 8, wherein the input energy includes heat energy.

10. The apparatus of claim 8, wherein the input energy includes one of infrared energy and microwave energy.

11. The apparatus of claim 1, comprising a linear motor including the ratchet mechanism, the activable member, and the operator mechanism.

12. The apparatus of claim 1, comprising a rotary motor including the ratchet mechanism, the activable member, and the operator mechanism.

13. The apparatus of claim 12, further comprising one or more activable members, the rotary motor further including a rotatable sleeve engageable by the activable members.

14. The apparatus of claim 1, further comprising a second ratchet mechanism, the first ratchet mechanism adapted to move the operator member and the second ratchet mechanism adapted to hold the position of the operator member.

15. The apparatus of claim 14, wherein the first ratchet mechanism is moveable by expansion of the material.

16. The apparatus of claim 15, further comprising a spring applying a force against the first ratchet mechanism in opposition to a force applied by the material.

17. The apparatus of claim 1, wherein the ratchet mechanism includes at least a Belleville spring having at least a sharp edge engageable against a surface of the operator member.

18. The apparatus of claim 1, wherein the ratchet mechanism includes at least a tablet having at least a sharp edge engageable against a surface of the operator member.

19. The apparatus of claim 18, wherein the operator member includes a shaft.

* * * * *